United States Patent [19]

Mitsumune et al.

[11] Patent Number: 5,717,780
[45] Date of Patent: Feb. 10, 1998

[54] CHECKING APPARATUS FOR FLAT TYPE DISPLAY PANELS

[75] Inventors: Toshifumi Mitsumune, Nara; Kengo Tanaka, Tenri; Toshiaki Tanaka, Ikoma, all of Japan

[73] Assignees: Sharp Kabushiki Kaisha, Osaka; Yokogawa ADS Corporation, Tokyo, both of Japan

[21] Appl. No.: 505,651

[22] Filed: Jul. 21, 1995

Related U.S. Application Data

[63] Continuation of Ser. No. 269,765, Jul. 1, 1994, abandoned.

[30] Foreign Application Priority Data

Jul. 13, 1993 [JP] Japan ............................. 5-173387

[51] Int. Cl.$^6$ .................................................. G06K 9/00
[52] U.S. Cl. ...................... 382/141; 382/148; 382/149; 382/152; 348/92
[58] Field of Search ......................... 382/100, 125, 382/141, 143, 148, 149, 152; 348/86, 92, 125, 201; 364/468.01

[56] References Cited

U.S. PATENT DOCUMENTS

| | | | |
|---|---|---|---|
| 4,020,463 | 4/1977 | Himmel | 382/3 |
| 4,301,450 | 11/1981 | Smoliar | 345/117 |
| 4,654,706 | 3/1987 | Davidson et al. | 348/86 |
| 4,791,586 | 12/1988 | Maeda et al. | 382/8 |
| 4,794,647 | 12/1988 | Forgues et al. | 382/8 |
| 5,029,222 | 7/1991 | Yamada et al. | 382/8 |
| 5,175,772 | 12/1992 | Kahn et al. | 382/8 |
| 5,293,178 | 3/1994 | Kobayashi | 348/92 |
| 5,377,279 | 12/1994 | Hanafusa et al. | 382/141 |
| 5,394,481 | 2/1995 | Kumagai et al. | 382/141 |
| 5,572,444 | 11/1996 | Lentz et al. | 382/141 |

FOREIGN PATENT DOCUMENTS

| | | |
|---|---|---|
| 2-291787 | 3/1990 | Japan . |
| 5-27704 | 2/1991 | Japan . |
| 3-123292 | 5/1991 | Japan . |
| 3-291093 | 12/1991 | Japan . |
| 4-4670 | 1/1992 | Japan . |
| 4-44493 | 2/1992 | Japan . |
| 4-207665 | 7/1992 | Japan . |
| 5-22239 | 3/1993 | Japan . |

*Primary Examiner*—Leo Boudreau
*Assistant Examiner*—Bipin Shalwala
*Attorney, Agent, or Firm*—Nixon & Vanderhye P.C.

[57] ABSTRACT

A checking apparatus for flat type display panels includes a multiple number of cameras used for picking up images of a check pattern that is generated by a check pattern generator in accordance with a check item and displayed on a liquid crystal panel and a high-speed image processor for processing the obtained image signal from the taken image so as to detect defects in accordance with the check item. Further, the apparatus is constructed such that, as to some check items, the area of the display panel is divided into a multiple number of sections and a multiple number of check patterns are displayed at the same time in respective sections to thereby perform checking on multiple check items simultaneously. Alternatively, the apparatus is constructed such that, checking as to some check items is performed by processing image signals obtained in only a previously designated part of the liquid crystal panel.

7 Claims, 5 Drawing Sheets

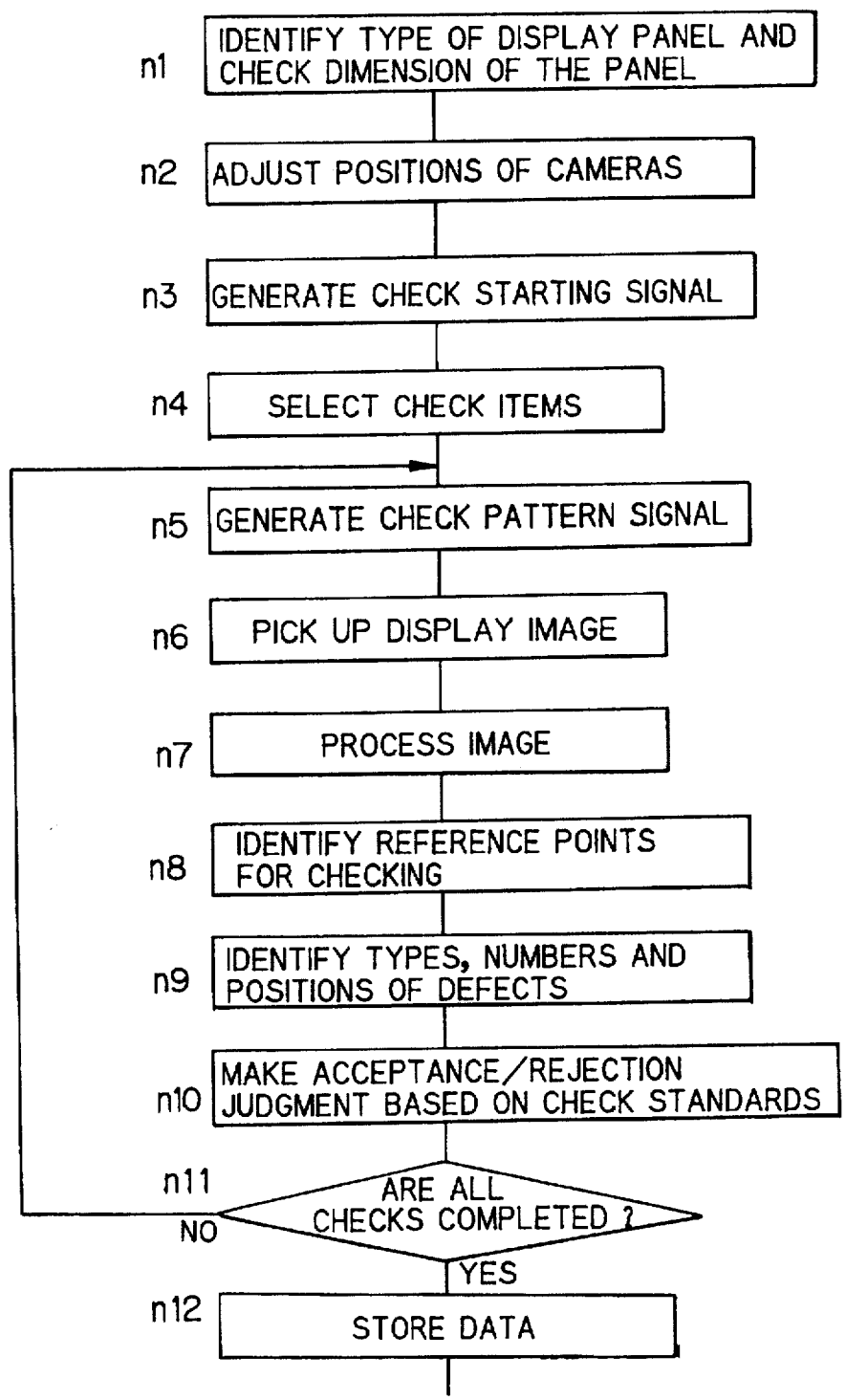

1

CHECKING APPARATUS FOR FLAT TYPE DISPLAY PANELS

This is a continuation of application Ser. No. 08/269,765, filed Jul. 1, 1994, now abandoned.

BACKGROUND OF THE INVENTION

(1) Field of the Invention

The present invention relates to a checking apparatus for detecting defects such as black spots, bright spots, line defects, display unevenness, contrast differences and the like in a flat type display panel such as of plasma display, EL display, liquid crystal display and the like. More particularly, the present invention relates to a checking apparatus of flat type display panels for locating such defects and determining the size, number, color and the like of the defects.

(2) Description of the Prior Art

Conventionally, in checking flat type display panels of this kind, typically, a liquid crystal panel being illuminated would be examined by an operator's visual observation so as to find defects on the display surface. Such an inspection by visual observation may cause detection accuracy to be ununiformed depending upon the capacity and physical condition of the operator and cannot completely exclude the possibility of oversights of detects. Further, it is impossible to identify positions of defects on the liquid crystal by the mere visual inspection. Accordingly, it is necessary to use an optical apparatus such as a microscope, etc. to locate positions of defects. Thus, this method disadvantageously requires a prolonged time for checking.

To deal with this, in recent years, some automatically detecting methods have been developed in which the display surface of the liquid crystal panel being illuminated is picked up by an image-pickup device such as a CCD camera, image scanner or the like to detect various defects on the liquid crystal panel surface with the help of image processing technologies.

One of those is disclosed in Japanese Patent Laid-Open Application Hei 4 No.44,493, which proposes a defect detecting apparatus for color liquid crystal panels. This apparatus comprises: an illuminating portion for illuminating a color liquid crystal panel; a memory portion in which data on a reference pixel set having defect-free pixels arrayed in the same pattern with those of pixel sets to be checked on defects has been stored in advance; an operating portion for calculating differences in brightness level between pixels contained in the pixel set to be checked and corresponding pixels in the reference pixel set and writing the absolute values of the differences of brightness levels into the memory portion; and a monitor portion for displaying only pixels having defects. For a detecting operation, firstly, a calculation is made in the operating portion on the differences of brightness levels between data of the first pixel set written in the memory portion and data of the reference pixel set. Secondly, the absolute values of the differences are written in the memory portion, while only pixel sets having defects are displayed in the monitor portion. In this way, data as to a first pixel set has been rewritten in the memory portion, then data-rewriting is carried out as to a second pixel set in the same manner. Thus, when checks as to all the pixel sets are completed, this means the finish of the checking of entire display surface of the color liquid crystal panel, so that the operation proceeds another inspection of a next color liquid crystal panel.

Meanwhile, current commercial products of liquid crystal panels have a large variation in size (diagonal dimension), ranging, for example, 0.7 in. to 15 in. and products having greater sizes will be developed and brought into the market in the near future. When all kinds of liquid crystal panels having such a variation are checked by an apparatus including a single image-pick camera and image processor so as to detect defects on the liquid crystal panel, the apparatus must be simple, but the resolution will lower as the size of liquid crystals become large. Even in such cases, there are few problems when detection is made on nicks or recesses of characters, patterns, pictures and the like generated on the liquid crystal panel and on density and display unevenness and the like. However, in a case where small back spots and bright spots or line defects of those combined are to be detected, the purpose of the defect checking can not be attained for the liquid crystal panels having a size greater than a certain level.

Checking of a liquid crystal panel includes many items such as black spots (black defect which does not allow light to transmit therethrough in a white display state), bright spots (white defect which causes light to transmit therethrough in a black display state), line defects in which black or bright spots are combined in a row, display unevenness which causes a part or parts of the image to be different in contrast or chromaticity, and like. Execution of all the checking items requires many image pickup operations and successive image processing for each of the checking items, thus taking a prolonged time for checking.

SUMMARY OF THE INVENTION

The present invention has been achieved in view of what was discussed above, and it is therefore an object of the present invention to provide an apparatus in which inspection for defects can be performed in an assured manner regardless of the size of a display panel to be examined and the time taken for the checking is reduced so that efficient check in a production line of the display panels can be achieved.

In accordance with a first aspect of the present invention, a checking apparatus for flat type display panels wherein a flat type display panel having a plurality of pixels arranged on a flat surface and performing image display by selectively driving the pixels is checked on display defects, comprises: display controlling means for displaying a check pattern on the flat type display panel in accordance with a check item; a plurality of pickup means for picking up an image of the check pattern displayed on the flat type display panel; and checking means for locating display defects on the display panel by processing image signals obtained from the pickup means in accordance with the check item, and the display controlling means is constructed such that as to plural predetermined check items a plurality of check patterns are displayed at the same time on respective parts into which the area of the flat type display panel is divided.

A second aspect of the present invention resides in that a checking apparatus for flat type display panels wherein a flat type display panel having a plurality of pixels arranged on a flat surface and performing image display by selectively driving the pixels is checked on display defects, comprises: display controlling means for displaying a check pattern on the flat type display panel in accordance with a check item; a plurality of pickup means for picking up an image of the check pattern displayed on the flat type display panel; and checking means for locating display defects on the display panel by processing image signals obtained from the pickup means in accordance with the check item, and the checking means is constructed such that as to predetermined check items, display defects on the display panel are located by processing image signals belonging to a certain, predetermined region of the display panel.

In accordance with the above configurations, since a plurality of pickup means pick up the image on the display panel for detecting defects, if the display panel is large, a plurality of parts into which the area of the display panel is divided are partly image-picked up by respective pickup means. Therefore, the resolution is improved so that it is possible to detect defects in an assured manner even when the display panel is large.

Further, since, as to some check items the area of the display panel is divided into a plurality of sections and a plurality of check patterns are displayed at the same time in respective sections to thereby perform inspection on plural check items simultaneously, it is possible to reduce the time required for checking. Alternatively, since inspection for defects as to some check items is performed by processing image signals obtained in only a previously designated part of the display panel, that is, only a part of the display region, it is possible to reduce the time for checking.

BRIEF DESCRIPTION OF THE DRAWINGS

FIG. 11 is a flow chart for explaining the operation in an embodiment of the present invention.

DESCRIPTION OF THE PREFERRED EMBODIMENTS

Embodiments of the present invention will hereinafter be described in detail with reference to the accompanying drawings.

Figure 1:
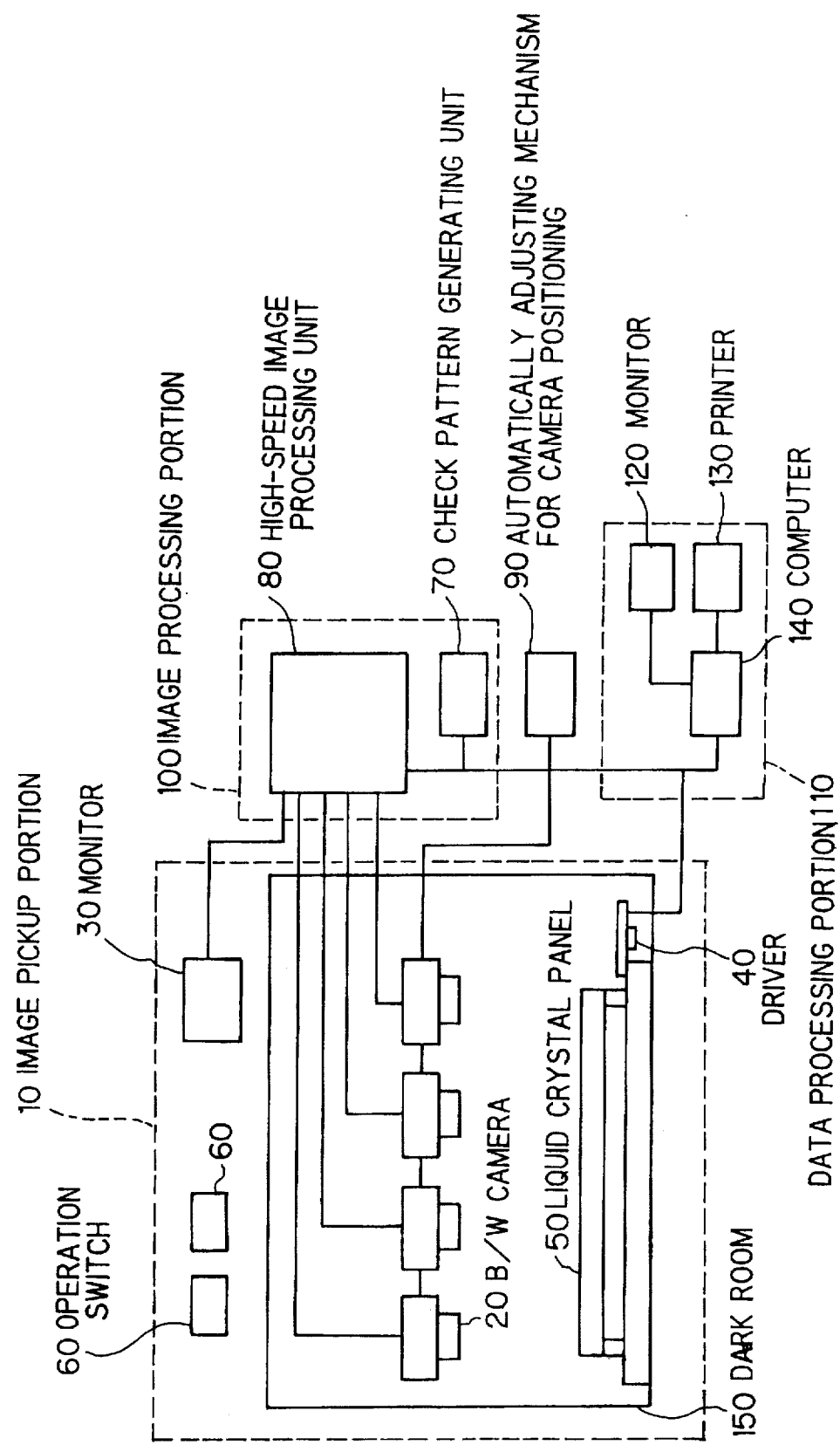
FIG. 1 is a schematic diagram showing an embodiment of a panel checking apparatus of the present invention.

FIG. 1 is a schematic diagram showing an embodiment of a liquid crystal panel checking apparatus of the present invention.

An image pickup portion 10 takes an image of a display pattern on a TFT liquid crystal panel 50 under examination, set in an image-pickup position so as to provide image data to an image processing portion 100. The image pickup portion 10 comprises four monochrome cameras 20 as pickup means for taking the image of liquid crystal panel 50, an image monitor 30 outside a dark room 150, operation switches 60 for starting inspection and emergency stop.

Image processing portion 100 includes a high-speed image processing unit 80 and a check pattern generating unit 70. Check pattern generating unit 70 serving as display controlling means generates check patterns in accordance with check items such as for example, black spots, bright spot, line defects, gradation failure and the like. The thus generated pattern will be displayed on liquid crystal panel 50 via a driver IC 40. High-speed image processing unit 80 serving as checking means detects, based on the image signals from the cameras 20 in image pickup portion 10, whether the image is registered in a predetermined display position as well as whether or not there exist any defects such as black spots, bright spot line defects, display unevenness, gradation failure in a manner described later. That is, the unit 80 serves as checking means to distinguish quality of TFT liquid crystal panels 50.

A data processing portion 110 integrally gathers checking information detected in high-speed image processing unit 80 in image processing portion 100 and acceptance/rejection judgment information into a computer 140 and outputs the information on a monitor 120 and via a printer 130. Operations of the checking apparatus are performed by way of data processing portion 110 and operation switches 60.

An automatically adjusting mechanism 90 for camera-positioning automatically drives cameras 20 to respective, predetermined positions in accordance with the size of liquid crystal panel 50 to be examined. Specifically, the mechanism moves each camera 20 in horizontal directions (i.e., X- and Y-directions) and a vertical direction (Z-direction) with respect to liquid crystal panel 50 that is horizontally placed.

Figure 2:
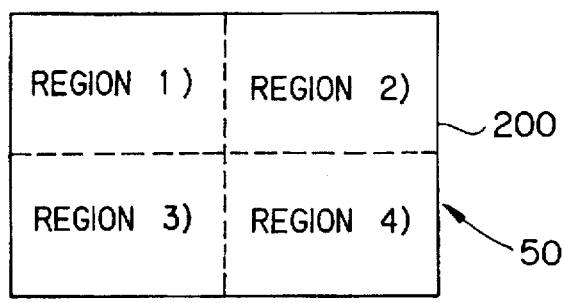
FIG. 2 is a view showing regions taken by respective cameras in an embodiment of the present invention.
Figure 3:
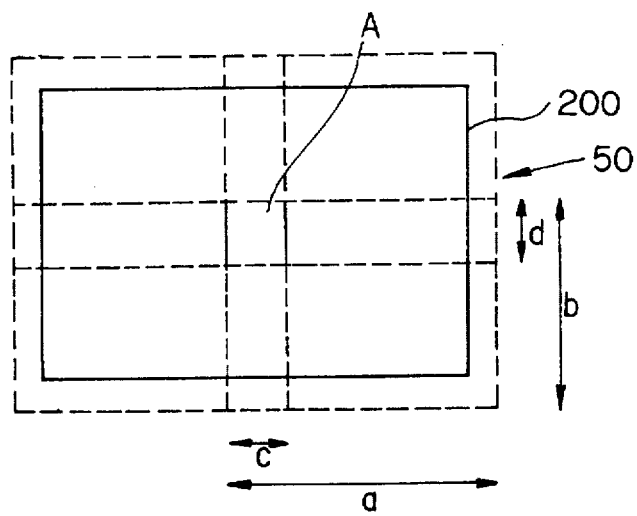
FIG. 3 is a view showing overlaps between image pickup regions taken by respective cameras in an embodiment of the present invention.

In the embodiment, the image frame 200 of the liquid crystal panel 50 under detection is divided into four regions 1) to 4) as shown in FIG. 2 and the divided regions are taken by respective four cameras 20 in image pickup portion 10 so that assured detection of defects can be performed even when liquid crystal panel 50 is large. Further, in this case, the four pickup fields (a×b) of cameras 20 overlap in their parts with one another (the overlap positions are shown by widths c and d). Regardless of the size of liquid crystal panel 50 under detection, the liquid crystal panel 50 is positioned such that the center of the panel locates at a center A of the portion in which all the four pickup fields of cameras 20 overlap.

Automatically adjusting mechanism 90 for adjusting focuses, apertures and positions of cameras adjusts the focuses and apertures of lenses of the four cameras 20 so that image-pickup conditions are made equal. More specifically, a predetermined image which should yield the same pickup image for every camera 20 is displayed on liquid crystal panel 50 and then the focuses and apertures of cameras 20 are adjusted so that the levels of image signals from respective cameras 20 may be equated.

On the other hand, as to a process in image processing portion 100 for the portion in which pickup fields of cameras 20 overlap, if the portion has any defect, the existence of the defect is ascertained by associated cameras 20 and the image is processed which is obtained through the pickup field taken by previously determined one of the associated cameras 20.

Figure 4:
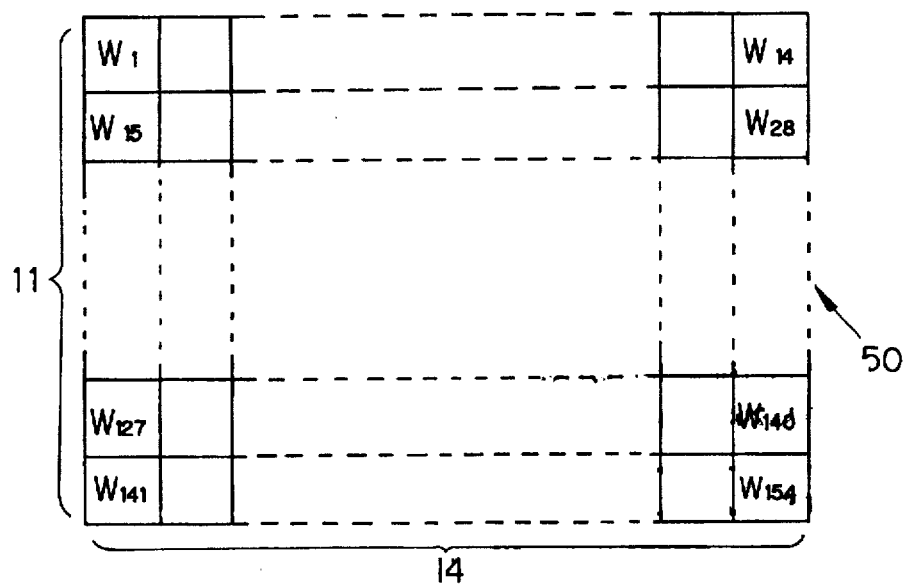
FIG. 4 is a view showing window regions for uniformalizing checking condition in an embodiment of the present invention.

In addition, the display surface of liquid crystal panel 50 as is image-taken by four cameras 20 may differ in brightness from place to place or from center to periphery due to light leak from the outside of dark room 150 and due to dispersed distribution of illumination of the backlight system. To deal with this, this embodiment provides a plurality of windows W1 to W154 partitioned on the display surface of liquid crystal panel 50 as shown in FIG. 4. Each of windows W1 through W154 is adapted to previously set an individual threshold for detecting defects, whereby the checking conditions may be made uniform. As an alternative embodiment of the present invention, the display surface can be divided as a unit of 20×20 dot area.

Figure 5:
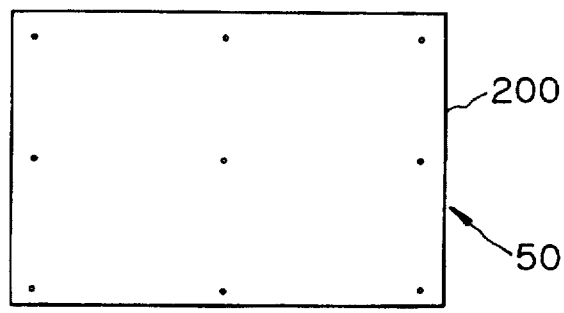
FIG. 5 is a view showing a display pattern for checking a reference position in an embodiment of the present invention.

Check pattern generating unit 70 generates several patterns to be displayed on liquid crystal panel. The patterns include the aforementioned display pattern used for the adjustment of focuses and apertures of cameras 20, a reference pattern used for checking the position as shown in FIG. 5, check patterns, as will be explained later, in accordance with checking items. Such check patterns include, for example, successive display of R, G and B images to be used for checking on black spots.

Figure 6:
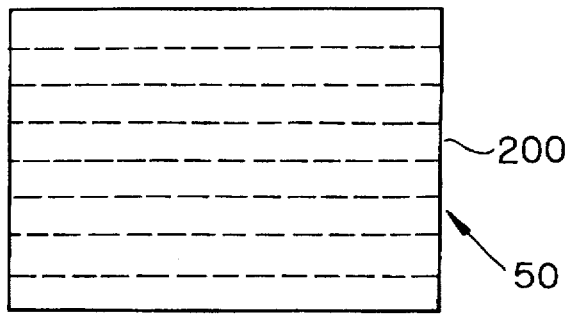
FIG. 6 is a view showing a normal pattern for checking gradation as a comparative example with an embodiment of the present invention.
Figure 7:
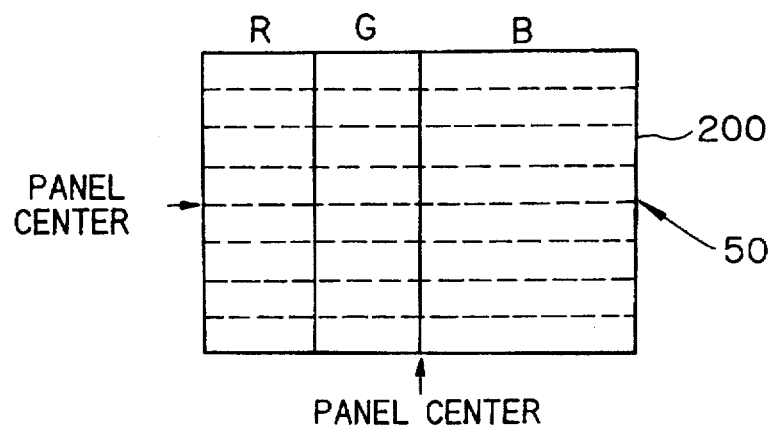
FIG. 7 is a view showing a pattern for checking gradation of an embodiment of the present invention.

In order to reduce the checking time, the check pattern generating unit 70 in the embodiment, simultaneously displays a plurality of check patterns for checking gradations by partitioning the area of liquid crystal panel 50. That is, when, in general, a horizontal image having eight gradations for each of R, G and B is checked, three check patterns each having eight gradations for each color R, G or B as shown in FIG. 6 are successively displayed. This embodiment, however, adopts only one pattern for gradation check for all the colors R, G and B. More specifically, the pattern for gradation check of the embodiment is partitioned, as shown in FIG. 7, by a panel center of liquid crystal panel 50 to form a half side section having eight gradation regions for R and G and the other half side section having eight gradation regions for B. Accordingly, conventional gradation check would require three successive image display whereas this method requires only one image display for checking gradations for all the colors.

Figure 8:
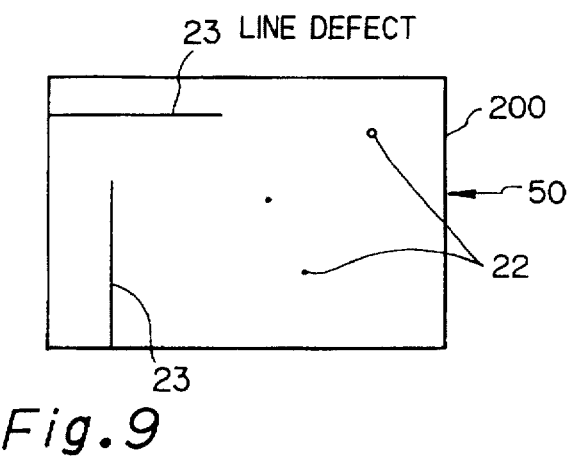
FIG. 8 is a view showing examples of defects on a display screen in an embodiment of the present invention.
Figure 9:
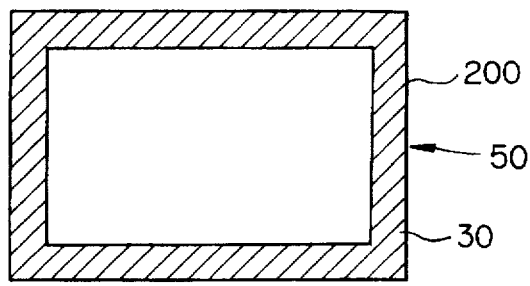
FIG. 9 is a view showing checking region for line defects in an embodiment of the present invention.

In order to achieve further reduction of checking time, the high-speed image processing unit 80 of the embodiment is adapted to effect inspection for line defects only in a region previously determined in place of executing the entire display area of liquid crystal panel 50. Specifically, all line defects 23 appear on liquid crystal panel 50 from end to end such as from top to bottom and from left to right as shown in FIG. 8. Therefore, in the embodiment, detection of line defects is performed by processing image signals that are associated with a peripheral portion 30 of image frame 200 of liquid crystal panel 50 as shown in FIG. 9. Here, designated at 22 in FIG. 8 are spot defects.

Figure 10:
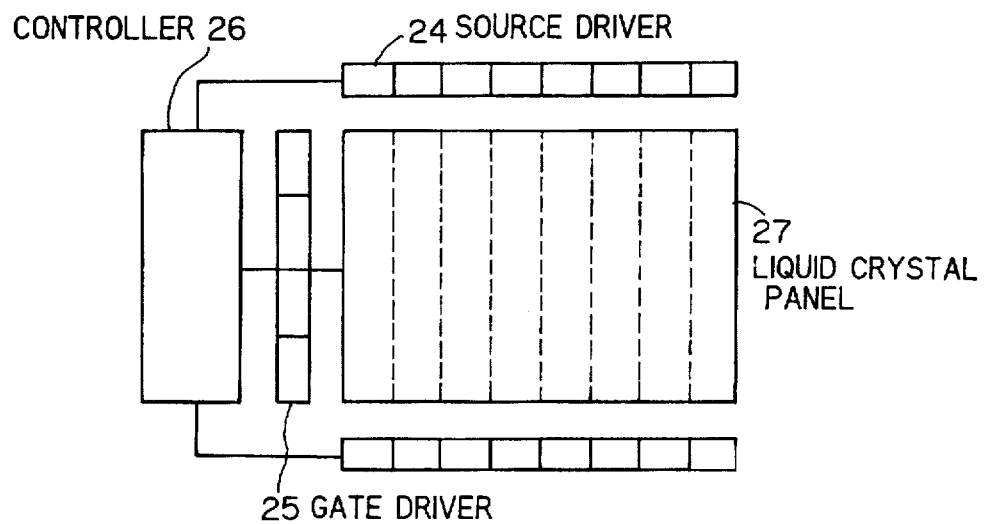
FIG. 10 is a block diagram showing a liquid crystal module in an embodiment of the present invention.

FIG. 10 shows a liquid crystal module used in the embodiment. The liquid crystal module includes, as shown in FIG. 10, source drivers 24, gate drivers 25, a controller 26 and a liquid crystal panel 27 having 640×3 (for RGB) dots in the horizontal direction and 480 dots in the vertical direction. As to source drivers 24, a plurality of IC elements, for example, eight elements are provided for each of upper and lower sides. Each pair of upper and lower source driver ICs are designed to drive dots in odd and even numbers, respectively, among the eighty horizontal dots. Therefore, by effecting an examination using check patterns for checking the dots in odd or even numbers, it is possible to find which source driver IC is abnormal if there appears any defect.

Next, checking procedures using the checking apparatus thus constructed will be discussed with reference to a flowchart shown in FIG. 11.

As a liquid crystal panel 50 mounted on a pallet is typically conveyed on a production line to image pickup portion 10, a bar code represented on the pallet is read so as to identify the dimension, type, etc. of the liquid crystal panel 50 (Step n1).

When the current liquid crystal panel 50 is different in size or type from the previously inspected liquid crystal panel, automatically adjusting mechanism 90 for positioning cameras effects automatic adjustment of positions of all the cameras 20 (Step n2).

Next, as a check starting signal is generated (Step n3), checking items are selected (Step n4). Subsequently, a check pattern in accordance with one of the check items selected is displayed on liquid crystal panel 50 (Step n5). The thus displayed image is picked up by four cameras 20 while automatic adjustment of brightness is performed varying the apertures of lenses so that the brightness may fall within a certain range (Step n6). Then the pickup image information is processed (Step n7). Thereafter, reference points for identifying the checking position are located (Step n8) and defects are extracted so that the defects are located, counted and classified, etc. (Step n9). Then the liquid crystal panel 50 under examination is determined to be good or bad based on check standards previously determined (Step n10).

More specifically, as to the checking order in the inspection, the following sequence of (a),(b) and (c) is performed in this order:

(a) identification of IC defects for each block;

(b) identification of existence of line defects; and (C) identification of spot defects, display unevenness and the other defects.

In this case, if a defect or defects are identified in (a), the checking steps (b) and (c) are performed in the portion except where the defect is identified to exist. On the other hand, if no defect is found in (a) but a line defect or defects are found in the checking step (b), the step (c) is performed in the portion except where the defect is identified to exist.

As an example, in a case of checking back spot defects, it is possible to identify positions and colors of black spots by successively checking R, G and B images.

In a case where a bright spot defect is to be detected, it is useful to notice that the bright spot defect pixel will not change in Gradation. Accordingly, gradation differences are taken for each of R, G and B. For example, with respect to R color, images having gradation levels A and B are successively displayed and the gradation difference between the two images is taken for each pixel. If any pixel having a gradation difference lower than a predetermined threshold or the pixel which does not exhibit variation in gradation, can be identified to be a bright spot pixel. The same operation is performed for G and B.

In the examination of gradation, the aforementioned gradation check pattern which is formed by dividing the area of liquid crystal panel 50 into sections as shown in FIG. 7 is displayed to effect gradation check.

In a case where line defects are examined, as has been discussed above referring to FIG. 9, only the peripheral region of liquid crystal panel 50 is inspected. In the embodiment, at first, line defects which are formed by combined black spots or bright spots are examined, thereafter, those free from line defects are checked with respect to black spots and bright spots. Other than the check items discussed heretofore, display unevenness, contrast difference and the like may be examined.

When all the check items selected are completed in the aforementioned manner, judgment of completion of checking presents "YES" at Step n11, and the operation proceeds to Step n12 in which data are stored.

On the other hand, if there remain any unchecked items among the check items selected, the judgment of completion of checking presents "NO", and the operation returns to Step n5 and repeats the same steps until the judgment of completion of checking presents "YES".

Contents of data stored in Step n12 include, for example, the following items:
- date and time of start of checking;
- control number of a module examined;
- data on positioning of the module;
- average brightness of the module surface; and
- image processing result for each of check items selected and acceptance/rejection judgment information.

As has been discussed heretofore, since a liquid crystal panel 50 is analyzed to detect defects by partially picking up images of the liquid crystal panel 50 using four cameras 20, it is possible to surely detect defects even when the liquid crystal panel 50 to be examined is large. Further, since gradation check is carried out by dividing the area of liquid crystal panel 50 and simultaneously displaying all the primary color gradations in only the one pattern thus divided, it is possible to reduce the time for checking. Moreover, since line defect check is performed by checking the peripheral region of liquid crystal panel 50, a further reduction of the time for checking can be achieved.

When the liquid crystal panel 50 to be examined is small, it is not necessary to effect detection by partially picking up the divided images using all the four cameras 20. In such a case, it is possible that all the cameras 20 are allowed to individually pick up the entire image of liquid crystal panel 50 and image signals obtained solely from one previously designated camera 20 are processed in order to perform detection of defects.

Thus, in accordance with the present invention, since a plurality of pickup means are used to pick up the image of a display panel to thereby detect defects, it is possible to surely achieve detection of defects even if the display panel is large.

Further, since, as to some check items the area of the display panel is divided into a plurality of sections and a plurality of check patterns are displayed at the same time in respective sections to thereby perform checking on plural check items simultaneously, it is possible to reduce the time required for checking. Alternatively, since checking on defects as to some check items is performed by processing image signals obtained in only a previously designated part of the display panel, the time for checking can be reduced.

What is claimed is:

1. A checking apparatus for flat display panels having a plurality of pixels arranged on a flat surface that displays images by selectively driving the pixels to check for display defects, said checking apparatus comprising:

display controlling means for simultaneously displaying a plurality of different check patterns simultaneously on said flat display panel in accordance with a check item, where said check patterns are displayed on different portions of the flat display panel;

a plurality of pickup means for picking up images of said check patterns displayed on said flat display panel, wherein one or more of said pickup means has a field of view of only a portion of the display panel corresponding to a respective one of said plurality of check patterns, and said one or more pickup means generates a respective image signal of the respective one of said check patterns in the field of view of the one or more pickup means; and checking means for locating display defects on said display panel by processing each of the respective image signals obtained from said one or more of said pickup means in accordance with the check item;

said display controlling means displaying said plurality of predetermined check patterns at the same time on respective portions of said flat type display panel corresponding to each of the portions viewed by each pickup means.

2. A checking apparatus for flat display panels having a plurality of pixels arranged on a flat surface that displays images by selectively driving the pixels to check for display line defects, and wherein said pixels are controlled by circuits coupled to the pixels by connection lines, said checking apparatus comprising:

display controlling means for displaying a check pattern on said flat display panel in accordance with a check item;

a plurality of pickup means for picking up an image of said check pattern displayed on said flat display panel, wherein said pickup means views a portion of the panel which portion is perpendicular to the connection lines of the driver circuits and extends from one end of the panel to an opposite end of the panel; and checking means for locating display line defects in the connection lines on said display panel by processing image signals obtained from said pickup means in accordance with the check item, said checking means detecting certain display line defects on said display panel by processing only image signals corresponding to a predetermined-peripheral region, where said images are of the portion of the panel extending perpendicular to the connection lines.

3. An apparatus for inspecting flat panel displays having an array of pixels arranged on a panel and that simultaneously displays a plurality of different check pattern images by selectively driving the pixels, wherein the apparatus comprises:

a display controller connectable to a flat panel display to be tested to display said different check pattern images simultaneously on said display;

a plurality of image detectors proximate to the display to be tested for viewing the check pattern images on the display, and wherein each image detector has a field of view that encompasses only a portion of the display corresponding to a respective one of the check pattern images, and a composite of the views from each image detector forms an image of all check pattern images being shown on the flat panel display;

an automatic adjustment means for automatically adjusting the relative distances between said plurality of image detectors and said display, wherein said displays have a plurality of sizes, and said automatic adjustment means moves the image detectors to a one of a plurality of predetermined positions corresponding to the size of the display being inspected;

an image process receiving as inputs the views from each of the image detectors and analyzing the views to detect defects in the display to be tested.

4. A checking apparatus for flat display panels according to claim 2, wherein said testing is performed from a first side of the screen to an opposite side of the display panel, where said first side is adjacent one of a source or gate driver circuits.

5. A checking apparatus for flat display panels according to claim 3, wherein an algorithm is automatically switched in accordance with a plurality of testings of display panels utilizing a merchandise management means such as a bar code.

6. A checking apparatus for flat type display panels, each flat type display panel having a plurality of pixels arranged on a flat surface and performing image display by selectively driving the pixels to check for display defects, said checking apparatus comprising:

a display controlling means for displaying a plurality of check patterns on said flat type display panel successively in accordance with a check item;

a plurality of pickup means for picking up images of said check patterns displayed on said flat type display panel, wherein one or more of said pickup means has a field of view of only a portion of the display panel corresponding to a respective one of said plurality of check patterns, and said one or more pickup means generates a respective image signal of the respective one of said check patterns in the field of view of the one or more pickup means; and checking means for locating display defects on said display panel by processing the respective image signals obtained from said pickup means in accordance with the check item, wherein the checking means displays a single check pattern on a whole screen region when checking for spot defects, and the checking means displays a plurality of check patterns on the screen simultaneously, when checking for a defect in a circuit for driving the pixels.

7. A checking apparatus for flat display panels according to claim 6, wherein said check patterns are graduation check patterns.

* * * * *